United States Patent
Yoshinobu et al.

(10) Patent No.: US 6,461,237 B1
(45) Date of Patent: Oct. 8, 2002

(54) COMPUTER READABLE PROGRAM PRODUCT STORING PROGRAM FOR BALL-PLAYING TYPE GAME, SAID PROGRAM, AND BALL-PLAYING TYPE GAME PROCESSING APPARATUS AND METHOD

(75) Inventors: Tomoaki Yoshinobu, Hyogo; Kazuhiko Iino, Saitama, both of (JP)

(73) Assignee: Square Co., Ltd., Tokyo (JP)

( * ) Notice: Subject to any disclaimer, the term of this patent is extended or adjusted under 35 U.S.C. 154(b) by 4 days.

(21) Appl. No.: 09/628,288

(22) Filed: Jul. 28, 2000

(30) Foreign Application Priority Data

Jan. 28, 2000 (JP) .................................... 2000-020922
May 31, 2000 (JP) .................................... 2000-163825

(51) Int. Cl.[7] .................................................. A63F 9/24
(52) U.S. Cl. .................. 463/3; 463/1; 463/3; 273/317; 273/317.1; 273/317.3; 273/317.5; 273/317.6
(58) Field of Search ............................ 463/1–8, 30–33, 463/36, 49–56; 434/16, 12, 37, 43, 61–62, 69, 307 R, 308–309; 273/317, 317.1, 317.16, 459, 460, 461; 345/418, 428, 433, 441, 439, 473, 474, 112, 121, 127

(56) References Cited

U.S. PATENT DOCUMENTS

| | | | | | |
|---|---|---|---|---|---|
| 5,767,861 A | * | 6/1998 | Kimura | ...................... | 345/473 |
| 5,863,248 A | * | 1/1999 | Mine et al. | ..................... | 463/4 |
| 6,102,801 A | * | 8/2000 | Sugawara | ..................... | 463/31 |
| 6,120,374 A | * | 9/2000 | Akada et al. | ................... | 463/3 |
| 6,149,520 A | * | 11/2000 | Takatsuka | ..................... | 463/4 |
| 6,183,363 B1 | * | 2/2001 | Ishihara et al. | ............... | 463/31 |
| 6,196,917 B1 | * | 3/2001 | Mathias et al. | ................ | 463/2 |
| 6,203,425 B1 | * | 3/2001 | Hayashi | ......................... | 463/1 |
| 6,244,956 B1 | * | 6/2001 | Nakayama et al. | ............ | 463/3 |
| 6,340,332 B1 | * | 1/2002 | Rimoto et al. | ................ | 463/31 |

FOREIGN PATENT DOCUMENTS

| | | |
|---|---|---|
| EP | 0916376 | 5/1999 |
| WO | 98/43715 | 10/1998 |

* cited by examiner

*Primary Examiner*—Jessica Harrison
*Assistant Examiner*—Yveste Cherubin
(74) *Attorney, Agent, or Firm*—Greenblum & Bernstein, P.L.C.

(57) ABSTRACT

A computer readable program product stores a program for a ball-playing type game enabling continuous action at the time a player catches a ball in a ball-playing game to be expressed smoothly. When a fielder starts a catching action, a difference between a position of a glove at the time the fielder catches the ball by a group of motion and an arrival position of the ball is calculated. The position of the glove at one motion based on a group of motion for catching in the catching motion of the fielder is corrected in accordance with the difference between the position of the glove and the arrival position. Other motion with the position of the glove corrected is displayed, and the position of the glove of the fielder is matched to the arrival position of the ball when the fielder catches the ball in the motion after correction.

12 Claims, 8 Drawing Sheets

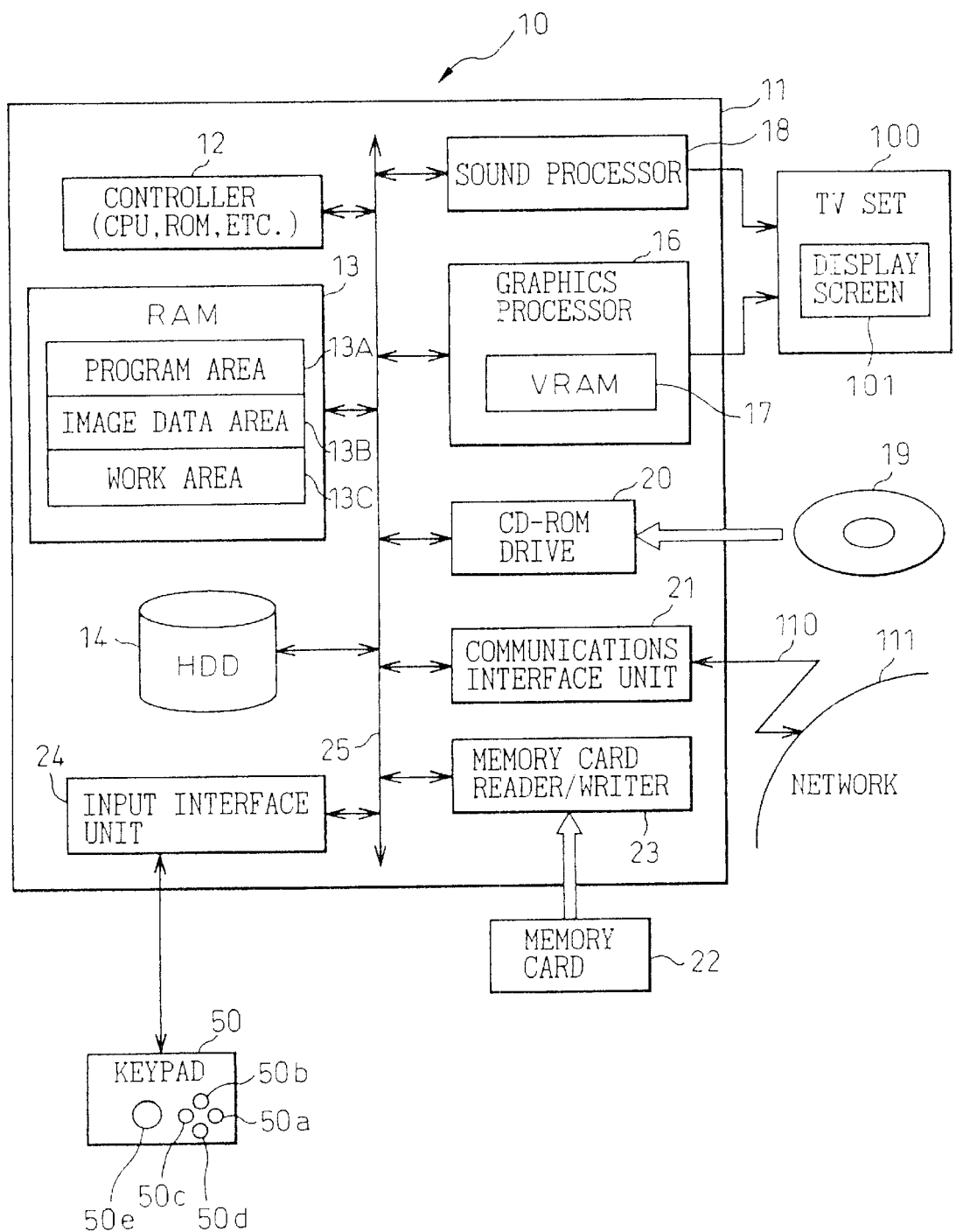

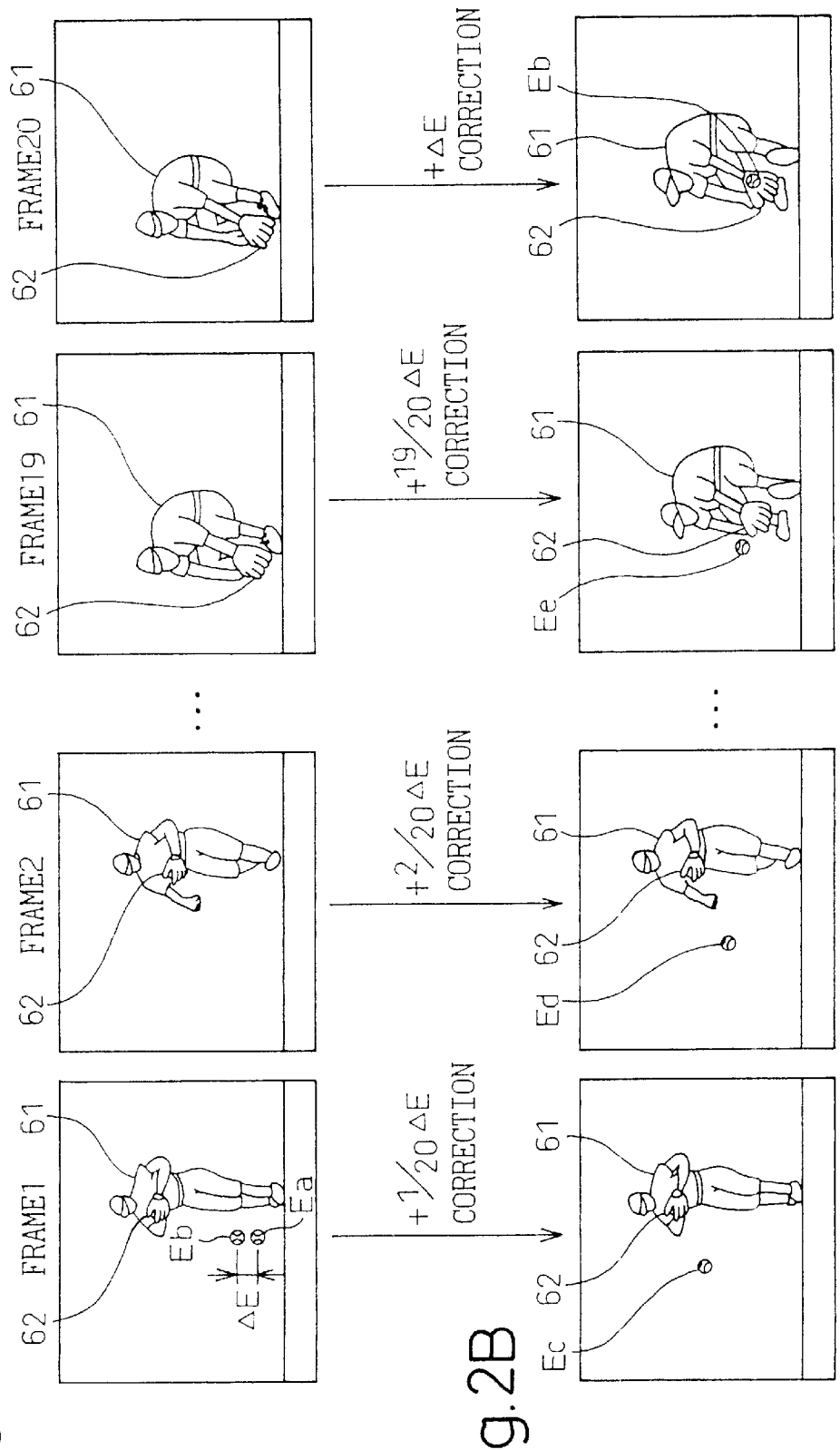

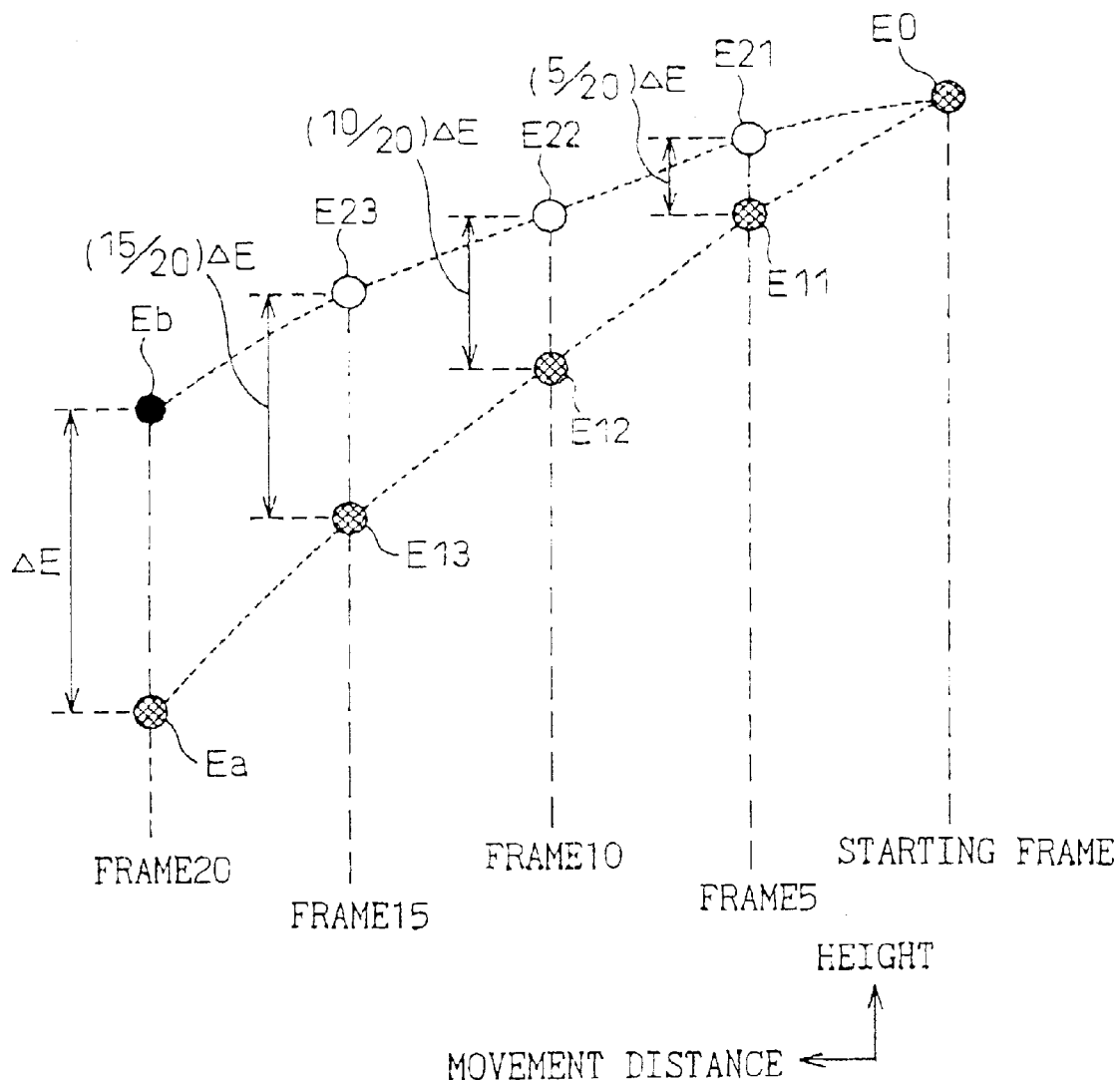

Fig.5

| DIRECTION | GROUP OF MOTIONS | NUMBER OF FRAMES | AMOUNT OF MOVEMENT PER FRAME | CATCHING RANGE | HEIGHT OF GLOVE WHEN CATCHING | RANGE OF CATCHABLE HEIGHT |
|---|---|---|---|---|---|---|
| A | #11 | 20 | 0.30 m | L1~L2 | H1 | 0~h1 |
|   | #12 | 20 | 0.30 m | L1~L2 | H2 | h1~h2 |
|   | #13 | 20 | 0.30 m | L1~L2 | H3 | h2~h3 |
|   | #14 | 20 | 0.30 m | L1~L2 | H4 | h3~h4 |
|   | #15 | 10 | 0.30 m | L1 OR LESS | H1 | 0~h1 |
|   | ... | ... | ... | ... | ... | ... |
| B | #21 | 20 | 0.20 m | L3~L4 | H1 | 0~h1 |
|   | #22 | 20 | 0.20 m | L3~L4 | H2 | h1~h2 |
|   | #23 | 20 | 0.20 m | L3~L4 | H3 | h2~h3 |
|   | #24 | 10 | 0.20 m | L3 OR LESS | H1 | 0~h1 |
|   | ... | ... | ... | ... | ... | ... |
| C | #31 | 20 | 0.15 m | L5~L6 | H1 | 0~h1 |
|   | #32 | 20 | 0.15 m | L5~L6 | H2 | h1~h2 |
|   | #33 | 20 | 0.15 m | L5~L6 | H3 | h2~h3 |
|   | #34 | 10 | 0.15 m | L5 OR LESS | H1 | 0~h1 |
|   | ... | ... | ... | ... | ... | ... |
| D | #41 | 20 | 0.20 m | L3~L4 | H1 | 0~h1 |
|   | #42 | 20 | 0.20 m | L3~L4 | H2 | h1~h2 |
|   | #43 | 20 | 0.20 m | L3~L4 | H3 | h2~h3 |
|   | #44 | 10 | 0.20 m | L3 OR LESS | H1 | 0~h1 |
|   | ... | ... | ... | ... | ... | ... |
|   | #M | 10 | 0.20 m | L3 OR LESS | H4 | h3~h4 |
|   | ... | ... | ... | ... | ... | ... |

Fig.6

| THROWING DIRECTION | THROWABLE DISTANCE |
|---|---|
| FORWARD | D1 ~ D2 |
| RIGHT | D1 ~ D2 |
| LEFT | D1 ~ D2 |
| BACK | D1 ~ D2 |
| FORWARD | 0 ~ D1 |
| ⋮ | ⋮ |
| FORWARD | D1 ~ D2 |
| RIGHT | D1 ~ D2 |
| LEFT | D1 ~ D2 |
| BACK | D1 ~ D2 |
| ⋮ | ⋮ |
| FORWARD | D1 ~ D2 |
| RIGHT | D1 ~ D2 |
| LEFT | D1 ~ D2 |
| BACK | D1 ~ D2 |
| ⋮ | ⋮ |
| FORWARD | D1 ~ D2 |
| RIGHT | D1 ~ D2 |
| LEFT | D1 ~ D2 |
| BACK | D1 ~ D2 |
| ⋮ | ⋮ |
| BACK | 0 ~ D1 |
| ⋮ | ⋮ |

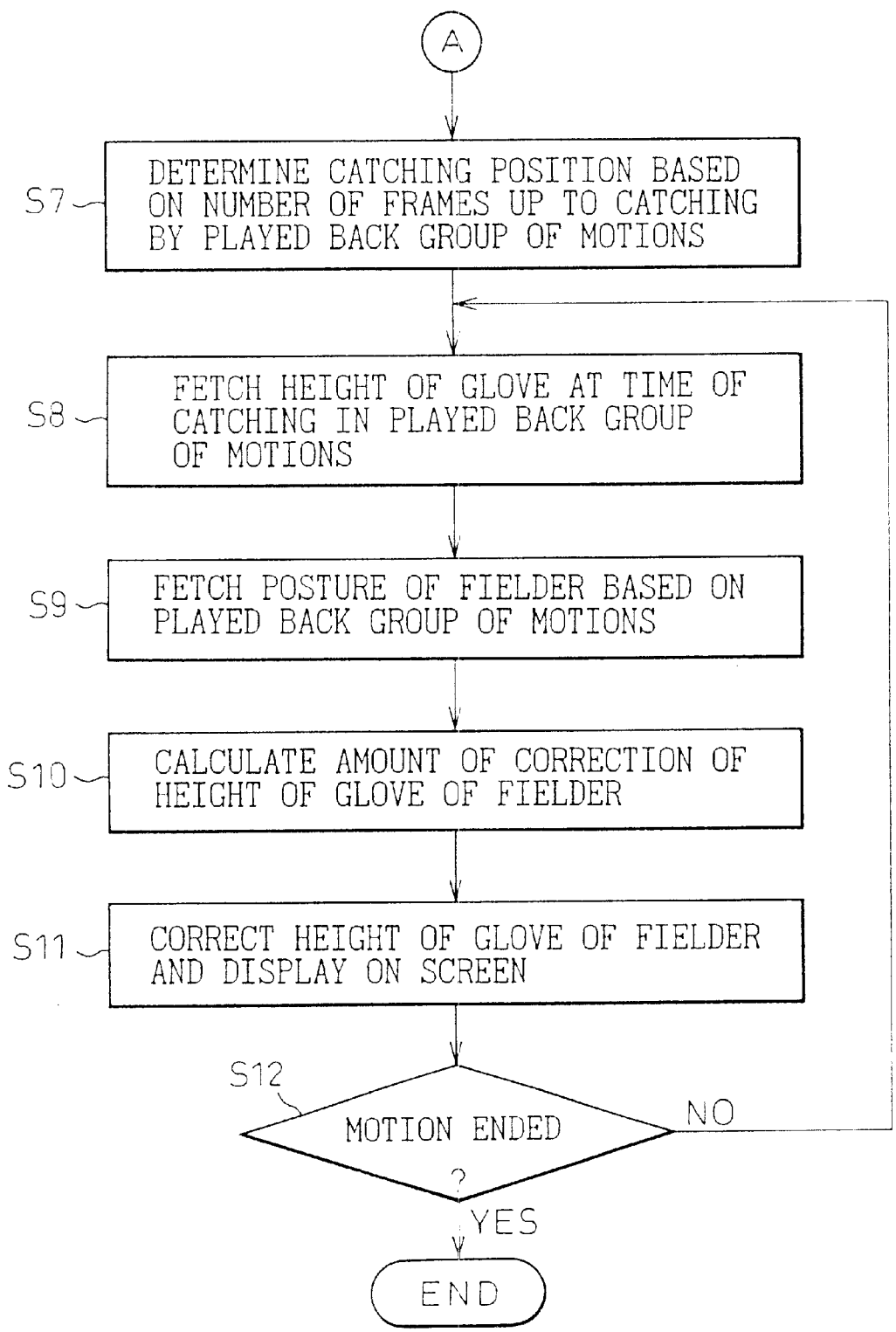

COMPUTER READABLE PROGRAM PRODUCT STORING PROGRAM FOR BALL-PLAYING TYPE GAME, SAID PROGRAM, AND BALL-PLAYING TYPE GAME PROCESSING APPARATUS AND METHOD

The present disclosure relates to subject matter contained in Japanese Patent Application No. 2000-163825, filed on May 31, 2000, the disclosure of which is expressly incorporated herein by reference in its entirety.

BACKGROUND OF THE INVENTION

1. Field of the Invention

The present invention relates to a computer readable program product storing a program of a ball-playing type game for controlling a player or ball in a ball-playing type game, such a program, and a ball-playing type game processor and method.

2. Description of the Related Art

At the present time, in sports types games, not only one-against-one contest games, but also group-against-group contest games have been realized such as tennis, soccer, basketball, American football, and baseball.

To play such sports type games, it is necessary to operate control units (control panels, keypads, etc.) provided in advance in an arcade machine or specialized game machine (PlayStation (made by Sony Computer Entertainment), Dreamcast (made by Sega Enterprise), etc.)

The control unit in general includes keys (or buttons) or a joystick. Whether a sports type game or a role-playing game, a control system including a limited number of buttons and number of joysticks on a control unit is incorporated. Of course, a game can also be played on a personal computer. If using a keyboard, keys necessary for control of the game are allocated from the keyboard.

In baseball, soccer, basketball, and other ball-playing type games in sports games, generally the movement of the ball itself cannot be controlled by the buttons or joystick. Instead, the user can control the motion of the player holding the ball or the movement of the player with respect to an incoming ball so as to indirectly control the direction or force of the next movement of the ball.

For example, in a baseball game, when the ball is flying toward a shortstop with no runners on base, the shortstop can be made to catch the ball if in the range of action where the shortstop can catch the ball. When making the shortstop catch the ball, the action of the shortstop catching the ball is displayed on the screen.

Advances in computer graphics have made it possible to smoothly express movement of a ball player in a three-dimensional virtual space. As this type of related art, for example, there is International Publication No. WO98/43715. This publication discloses the art of realizing a catching action by combining several types of motion.

Summarizing the problem to be solved by the invention, in general, in baseball, a glove is used to catch a ball. When reproducing the catching action of the ball player by motion, positional deviation sometimes occurs between the glove of the ball player and the ball at the time of catching the ball. In the art of the above International Publication No. WO98/43715, if the positional deviation between the glove and ball is within an allowable range, the catching action is displayed.

However, if the ball player catches the ball despite a deviation in position of the glove and ball at the time of catching the ball, an unnatural image will result. In particular, if realistically reproducing even the fine movement of the ball players, this unnaturalness of the image due to the positional deviation between the glove and ball at the time of catching the ball stands out.

Therefore, if desiring to reproduce fine movement of the ball player by smooth motion, the smoother the motion, the more the unnaturally expressed portion resulting from the deviation in position between the glove and ball stands out. Therefore, the balance in expression becomes poor and conversely a strange feeling is given to the user.

While the above explanation was given taking as an example a baseball game, the need to make the part of the body of the player or the equipment held by the player accurately match the position of the ball applies to all ball-playing type games involving balls. Examples of such ball-playing type games include soccer, basketball, tennis, American football, and ice hockey.

SUMMARY OF THE INVENTION

An object of the present invention is to provide a computer readable program storing a program of a ball-playing type game which, when making a player perform a catching action by motion in the ball-playing type game, enables the part of a player to be brought into contact with a ball and the position of the ball accurately match, such a program, a ball-playing type game processor, and a method of the same.

According to a first aspect of the present invention, there is provided a computer readable program product storing a program of a ball-playing type game for realizing a ball-playing type game controlling action of a player catching a moving ball. The program product stores a program for making a computer calculate a trajectory of a ball, predict a point of time on a time axis when a player catches the ball from a group of motion linked with the player in advance and the calculated trajectory, calculate a deviation in positional relationship between a catching pose of the player and the ball on the calculated trajectory before and after the predicted point of time, calculate a correction amount for the catching pose of the player based on the calculated deviation in the positional relationship, and correct the group of motion prepared in advance based on the calculated correction amount in at least part of the time when displaying the player based on the group of motion prepared in advance.

According to a second aspect of the present invention, there is provided a program of a ball-playing type game for realizing a ball-playing type game controlling action of a player catching a moving ball. The program makes a computer calculate a trajectory of a ball, predict a point of time on a time axis when a player catches the ball from a group of motion linked with the player in advance and the calculated trajectory, calculate a deviation in positional relationship between a catching pose of the player and the ball on the calculated trajectory before and after the predicted point of time, calculate a correction amount for the catching pose of the player based on the calculated deviation in the positional relationship, and correct the group of motion prepared in advance based on the calculated correction amount in at least part of the time when displaying the player based on the group of motion prepared in advance.

According to a third aspect of the present invention, there is provided a ball-playing type game processor including a computer readable program product storing a program of a ball-playing type game for realizing a ball-playing type game controlling action of a player catching a moving ball, a computer for reading and executing at least part of the program from the program product, and a display for displaying the ball-playing type game realized by the program. The computer reads at least part of the program from the program product and thereby calculates a trajectory of a ball, predicts a point of time on a time axis when a player catches the ball from a group of motion linked with the player in advance and the calculated trajectory, calculates a deviation in positional relationship between a catching pose of the player and the ball on the calculated trajectory before. After the predicted point of time, it calculates a correction amount for the catching pose of the player based on the calculated deviation in the positional relationship, and corrects the group of motion prepared in advance based on the calculated correction amount in at least part of the time when displaying the player based on the group of motion prepared in advance.

According to a fourth aspect of the present invention, there is provided a ball-playing type game processing method for realizing a ball-playing type game controlling action of a player catching a moving ball. The method includes calculating a trajectory of a ball, predicting a point of time on a time axis when a player catches the ball from a group of motion linked with the player in advance and the calculated trajectory, calculating a deviation in positional relationship between a catching pose of the player and the ball on the calculated trajectory before and after the predicted point of time, calculating a correction amount for the catching pose of the player based on the calculated deviation in the positional relationship, and correcting the group of motion prepared in advance based on the calculated correction amount in at least part of the time when displaying the player based on the group of motion prepared in advance.

BRIEF DESCRIPTION OF THE DRAWINGS

These and other objects and features of the present invention will become clearer from the following description of the preferred embodiments given with reference to the attached drawings, in which:

FIG. 1 is a block diagram of an example of the hardware configuration of an embodiment of the present invention;

FIG. 2A is a view of an example of motion before correction according to an embodiment of the present invention, while FIG. 2B is a view for explaining an example of motion after correction according to an embodiment of the present invention;

FIG. 3 is a view of an example of a change of position of a glove according to an embodiment of the present invention;

FIG. 5 is a view generally explaining an example of management of motion according to an embodiment of the present invention;

FIG. 6 is a view generally explaining an example of management of motion according to an embodiment of the present invention;

FIG. 8 is a flow chart for explaining an example of operation according to an embodiment of the present invention.

DESCRIPTION OF THE PREFERRED EMBODIMENTS

Figure 4A:
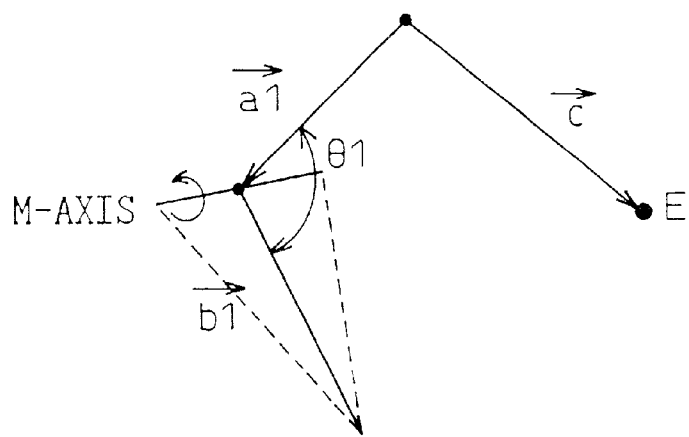
FIG. 4A is a view of an example of the state of an arm before angle correction according to an embodiment of the present invention.

Preferred embodiments of the present invention will be explained below with reference to the drawings. In the following explanation, a baseball game is used as an example among the various ball-playing type games.

First, an explanation will be made of the configuration using FIG. 1. FIG. 1 shows an example of the configuration of a video game system according to an embodiment of the present invention. The video game system 10 shown in FIG. 1 is provided with the functions of a ball-playing type game processor according to an embodiment of the present invention. Further, the video game system 10 executes a program stored on a computer readable program product according to an embodiment of the present invention. Further, the video game system 10 is used for working the ball-playing type game processing method according to an embodiment of the present invention.

The video game system 10 is, for example, including a game console 11 for processing a video game in accordance with a program, a keypad 50 for interactively controlling the video game, and a television set (hereinafter called a "TV set") having a cathode ray tube (CRT) etc. as a monitor with speakers. Further, this video game system 10 is provided with a communications interface unit 21 and is connected to a network 111 by a communications line 110 for data communications with another network apparatus.

The keypad 50 has a group of buttons (buttons 50a, 50b, 50c, 50d, etc.) or a joystick 50e able to be operated by the user (operator). Instructions due to the button operation or joystick operation of the user are given to the game console 11. Here, the group of buttons and joystick 50d have the functions of inputting a pitching operation of the pitcher, a swinging operation of the batter, a stealing operation of a runner, and a catching/throwing operation of a fielder.

The TV set 100 displays a video (image) or outputs sound in accordance with the content of the game based on a video signal and sound signal output from the game console 11.

The game console 11 has an internal bus 25. The internal bus 25 has connected to it a controller provided with a central processing unit (CPU), read only memory (ROM), and other units, a random access memory (RAM) 13, and a hard disk drive (HDD) 14.

The controller 12 controls the hardware as a whole and stores all or part of the program in the RAM 13 for execution of the game processing.

The RAM 13 is provided with a program area 13A, an image data area 13B, a work area 13C, etc. The program area 13A stores the program of the game. Specifically, the program area 13A stores all or part of the game program read by the CD-ROM drive 20 from the CD-ROM 19. The image data area 13B stores image data such as the background or game characters required in the process of execution of the program. The work area 13C stores various types of data generated in the process of execution of the program. For example, the work area 13C stores model data of the characters and groups of motion for each character. Note that the game program and image data can be supplied from an HDD 14 other than a CD-ROM 19. In this case, the game program or image data may be stored in the HDD 14. The HDD 14 may store the game program or image data installed in advance or downloaded through the communications line 110 from the network 111.

Further, the internal bus 25 has connected to it an input interface unit 24, a sound processor 18, and a graphics processor 16. The keypad 50 is connected through the input interface unit 24 to the internal bus 25. Further, the TV set 100 connects the sound processor 18 and graphics processor 16 through it to the internal bus 25.

The graphics processor 16 is provided with a video random access memory (VRAM) 17 having a frame buffer. The graphics processor 16 generates a video signal based on the image data stored in the frame buffer by instructions from the controller 12 along with execution of the program and outputs the video signal to the TV set 100. Due to this, an image is displayed on the display screen 101 of the TV set 100 by the image data stored in the frame buffer.

The sound processor 18 generates a sound signal expressing voices, background music (BGM), sound effects, etc. in accordance with the instructions from the controller 12 and outputs the sound signal to the TV set 100.

The internal bus 25 further has connected to it a CD-ROM drive 20 and a memory card reader-writer 23. The CD-ROM drive 20 reads the game programming, image, sound data, etc. stored in the program product, that is, the CD-ROM 19. The memory card reader-writer 23 writes data to and reads data from the memory card 22 in accordance with the control of the controller 12. The data written in the memory card 22 includes data showing the intermediate progress of the game, data indicating the environment settings of the game, etc.

Next, an explanation will be made of the relationship between the change in state of the player and the operations of the user according to an embodiment. FIGS. 2A and 2B are views explaining an example of correction of the pose of the player in motion up until catching according to this embodiment.

First, an explanation will be given of an example of the operation up to catching. FIG. 2A shows an example of the change in state of the motion up to catching linked with a player. FIG. 2B shows an example of the change of state of the motion after correction of the pose. FIGS. 2A and 2B show the pose of the player 61 and position Ea, Eb, Ec, Ed and Ee, and Eg of the ball for each frame from the start of the catching motion to the catching. Further, in this embodiment, the trajectory of the moving ball is calculated and the point of time on a time axis when the player will catch the ball is found from the calculated trajectory and the motion linked with the fielder (player). Further, the deviation between the position Ea of the glove (catching part of fielder) at the catching pose in the motion before correction of the glove position at the predicted point of time (or before and after predicted point of time) and the arrival position Eb of the ball is calculated. In the present embodiment, the deviation in for example the height direction is calculated. The deviation in height between the position Ea of the glove at the catching pose in the motion before correction of the ball and the arrival position Eb of the ball is $\Delta E$.

Here, the amount of correction of the height of the glove is calculated. The amount of correction for each frame can for example be calculated by the following equation:

Amount of correction=(height of arrival position of ball−height of glove at time of catching in reproduced group of motion)×(number of frames from start of reproduced motion to current time/number of frames from start of reproduced motion to catching)     1

The amount of correction found here is added to the position of the glove in the current frame to find the height of the glove at each frame.

Before the fielder 61 starts the catching action, as shown in FIG. 2A, the fielder 61 adopts a waiting pose for catching in the state with the glove 62 on its hand. When the ball is hit back by the batter, the future position of the ball is judged. Further, when it is judged that the fielder can reach the future position of the ball first by the group of motion linked with the fielder 61, the action of the fielder 61 due to the group of motion is started. Note that in the example of FIGS. 2A and 2B, the number of frames from the start of the catching action to the catching is 20.

As shown in FIGS. 2A and 2B, when the position Ec of the ball approaches the fielder 61 and enables the ball to be caught, the catching action of the fielder 61 is started. Further, in frame 1, the position of the glove 62 of the player 61 due to the group of motion is corrected by exactly $+1/20 \times \Delta E$ in the upward direction in the screen. Further, the image of the player with the glove 62 moved to the corrected position is displayed on the screen.

In the next frame 2, the position of the glove 62 of the player 61 resulting from the group of motion is corrected in the upward direction in the screen by exactly $+2/20 \times \Delta E$. Further, the image of the player 61 with the glove moved to the corrected position is displayed on the screen. At this time, the ball is at the position Ed. After this, the ball approaches the arrival position Eb.

The position of the glove is similarly corrected for every frame. In the frame 19, the position of the glove 62 of the player 61 due to the group of motion is corrected in the upward direction in the screen by exactly $+19/20 \times \Delta E$. Further, the image of the player 61 with the glove moved to the corrected position is displayed on the screen. At this time, the ball is at the position Ee.

In the frame 20, the position of the glove 62 of the player 61 due to the group of motion is corrected in the upward direction in the screen by exactly $+\Delta E$. That is, the position of the glove 62 is corrected to the arrival position Eb of the ball. Further, the image of the player 61 with the glove moved to the arrival position Eb of the ball is displayed on the screen. At this time, the ball also arrives at the arrival position Eb. Due to this, the position of the ball and the glove 62 can be made to accurately match each other.

As shown in frame 20 of FIGS. 2A and 2B, in the pose of the player 61 before correction, the glove 62 is at the position Ea close to the ground. The arrival position Eb of the ball, however, is separated from the ground by $\Delta E$. In such a case, by correcting the position of the glove 62 for each frame, a visually natural, smoother catching action is displayed on the screen.

FIG. 3 shows an example of the change in the glove position before and after correction. In the figure, the vertical axis shows the change in the height of the glove from the ground, while the horizontal axis shows the distance of movement of the glove position in reverse time. The example of FIG. 3 shows the positions E11, E12, and E13 of the frame 5, frame 10, and frame 15 from the position E0 of the glove at the starting frame to the position Ea of the glove at the catching pose due to the motion before correction. Further, it shows the positions E21, E22, and E23 of the glove after correction of frame 5, frame 10, and frame 15.

As shown in FIG. 3, the amount of correction of the position of the glove in frame 5 is $5 \times \Delta E/20$. The amount of correction of the position of the glove in frame 10 is $10 \times \Delta E/20$. The amount of correction of the position of the glove in frame 15 is $15 \times \Delta E/20$. Further, in frame 20, the glove position is corrected by exactly $\Delta E$.

As will be understood from FIG. 3, by making the amount of correction of the glove position increase for each frame, it is possible to make the position of the glove after correction change smoothly. As a result, even the motion of the player after correction of the glove position become smooth.

Next, an explanation will be given of the method of correction of the pose of the player after the glove position after correction is determined. In the present embodiment, for example, the frame of the player is expressed by a skeleton. The skeleton includes arcs connected in accordance with the frame of a human being. Each arc shows a bone of the player. In the skeleton, the connections between arcs and the lengths of the arcs are defined. In a group of motion, the pose of the player is defined by defining the angles formed between the connected arcs for each frame.

In the present embodiment, for example, the position of the glove after correction is determined, then inverse kinematics are used to enable correction of the angle of the joints (shoulders and elbows) of the arms of the player. Below, an explanation will be given of an example of the method of correction of the pose of the player.

Figure 4B:
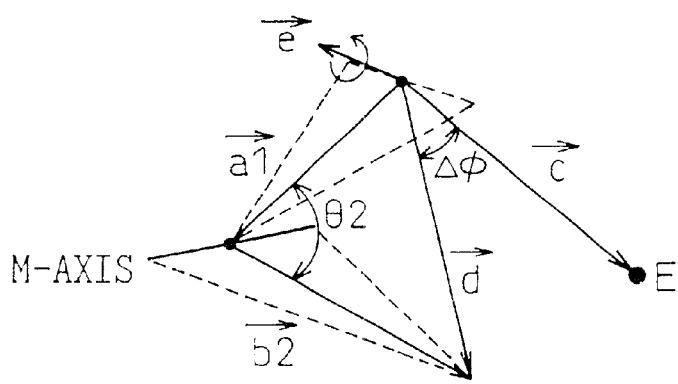
FIG. 4B is a view of an example of the state of correction of the angle of an elbow according to an embodiment of the present invention.
Figure 4C:
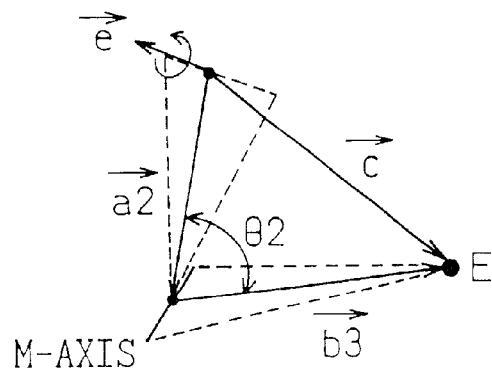
FIG. 4C is a view of an example of the state of correction of the angle of the elbow and shoulder according to an embodiment of the present invention.

FIGS. 4A, 4B, and 4C are views of an example of the method of correction of the angle in the present embodiment. FIG. 4A shows the state of the arm before correction of the angle, FIG. 4B shows the state of correction of the angle of the elbow, and FIG. 4C shows the state of correction of the angle of the elbow and the shoulder. In the figures, the vectors a1 and a2 are vectors showing the arc of the upper arm (vectors from position of base end of arm to position of elbow). The vectors b1, b2, and b3 are vectors showing the arc of the forearm (vectors from position of elbow to position of wrist). Further, the vector from the position of the base end of the arm to the position E of the glove after correction is made the vector C.

The angle between the vector a1 and vector b1 before correction of the angle (angle of elbow joint) is made θ1. Further, the elbow joint can be rotated only around the predefined M-axis. Note that the M-axis is defined by the relative position and angle with respect to the vector a1.

Next, an explanation will be given of an example of the method of calculation for correcting the arm of a fielder. Note that in the following equation 2, equation 3, equation 4, and equation 5, "·" show the dot product and "X" shows the cross product of the vectors. Further, to differentiate from the cross product of the vectors, multiplication is shown by "*".

First, the angle of the elbow is corrected. This is done, as shown in FIG. 4B, by making the vector b1 rotate to change it to the vector b2. At this time, the vector d1 obtained by adding the vector a1 and the vector b2 is made the same length as the vector c1. In this case, the angle θ2 of the elbow joint after correction may be found for example in the following way. First, cos θ2 is found from the law of cosines as:

$$\cos \theta 2 = (|\text{vector } a1|^2 + |\text{vector } b1|^2 - |\text{vector } c1|^2)/(2*|\text{vector } a1|*|\text{vector } b|) \quad 2$$

If cos θ2 is obtained, the angle θ2 can be calculated from the inverse function of the cosine (arc cosine). Since it is defined that the elbow joint can rotate only around the M axis, to make the angle of the elbow joint found by this calculation θ2, it is sufficient that the vector b1 be rotated around the M axis counterclockwise in the figure. The vector after rotation of the vector b1 is the vector b2.

After changing the angle of the elbow joint to the angle θ2, the vector d from the base end of the arm to the wrist is calculated by the following equation:

$$\text{Vector } d = \text{vector } a1 + \text{vector } b2 \quad 3$$

Note that the "+" in equation 3 shows the addition of vectors.

Further, the vector e vertical to the vector d and the vector c is found by the following equation:

$$\text{Vector } e = \text{vector } d \times \text{vector } c/(|\text{vector } d \times \text{vector } c|) \quad 4$$

Note that vector e is a unit vector. The axis passing through the shoulder joint (position of base end of arm) and parallel to vector e is made the rotation axis for making the vector d and vector c match.

Further, the cos $\Delta_l$ in the case where the rotation angle is made $\Delta_l$ is found from the following equation:

$$\cos \Delta_l = \text{vector } d \cdot \text{vector } c/(|\text{vector } d|*|\text{vector } c|) \quad 5$$

If cos $\Delta_l$ is obtained, the angle $\Delta_l$ can be calculated from the inverse function of the cosine (arc cosine).

Further, as shown in FIG. 4C, the axis passing through the shoulder joint and parallel to vector e is made the rotation axis and the arm is made to rotate counterclockwise in the figure by exactly the angle $\Delta_l$ so as to correct the angle of the arm and the shoulder joint. In FIG. 4C, the vector showing the upper arm after correction is the vector a2. The vector showing the forearm after correction is the vector b3. The position E of the baseball glove (attached to position of wrist) which the fielder fits on his hand is corrected in this way.

Note that this correction processing can be found by a quaternion.

Next, an explanation will be given of an example of data management relating to groups of motion using FIG. 5 and FIG. 6. FIG. 5 and FIG. 6 are views explaining the relation between groups of motion and data for selecting the groups of motion in the present embodiment. Note that the data set in FIG. 5 and FIG. 6 is read from for example the CD-ROM 19 and stored in the work area 13C of the RAM 13.

FIG. 5 and FIG. 6 show the motion information relating to catching and throwing set for each fielder. The motion information relating to catching means multiple types of groups of motion assigned for each direction heading toward catching by the fielder. The groups of motion include the number of frames, amount of movement per frame, range of catching, height of the glove at the time of catching, range of catchable height, throwing direction, and throwable distance linked together.

The "number of frames" indicates the number of frames used for going through a series of motion. The "number of frames" specifically means the number of frames required from the catching pose of the fielder to catching. The "amount of movement per frame" means the distance which the fielder can move over per frame. The "catching range" indicates the distance at which a fielder can catch a ball given with reference to the position of the fielder. The "height of the glove at the time of catching" indicates the height at which the glove is positioned given with reference to the ground of the baseball field. The "throwing direction" indicates the direction in which the ball is thrown given with reference to the orientation of the fielder at the time the fielder throws the ball. The "throwable distance" indicates the maximum distance from the fielder to where he throws the ball. The data will be explained in further detail next. The "direction" column is set with data indicating 360 degree directions about the position of the fielder such as A, B, C, and D. In FIG. 5, for example, the direction A may be made forward from the fielder, the direction B toward the left from the fielder, the direction C toward the back from the fielder, and the direction D toward the right from the fielder.

The "groups of motion" column stores the groups of motion linked with the fielders (motion data defining motion). In FIG. 5, the groups of motion are shown by numbers (#) for identifying the groups of motion. The groups of motion are set linked with the directions of movement of the fielder. As shown in FIG. 5, multiple groups of motion are linked with each direction of movement.

In the present embodiment, the direction A has for example the groups of motion #11, #12, #13, #14, #15 . . . linked with it. The direction B has for example the groups of motion #21, #22, #23, #24, . . . linked with it. The direction C has for example the groups of motion #31, #32, #33, #34, . . . linked with it. Further, the direction D has for example the groups of motion #41, #42, #43, #44, . . . #M (M is a natural number) linked with it.

The "NUMBER OF FRAMES" column is set with the amount of frames linked with the groups of motion and required from the state of the start of the catching action in a series of motion to the end of the catching action.

In the present embodiment, the number of frames corresponding to the groups of motion #11, #12, #13, #14, #21, #22, #23, #31, #32, #33, #41, #42, and #43 is for example set to "20". Further, the number of frames corresponding to the groups of motion #15, #24, #34, #44, . . . #M is set to for example "10". For example, if an actual fielder catches a ball in 1 second, 1 second is required for realistically expressing that action. Therefore, if an actual fielder catches a ball in 1 second, the number of frames of motion for expressing that action is set to the number of frames for 1 second (if the display period of 1 frame is 1/60 second, 60 frames). Note that the number of frames of the groups of motion is set to a number of frames suitable for the catching action of the fielder by a group of motion to be displayed realistically and smoothly by the optimal change of state.

The "amount of movement per frame" column is set with a distance which a fielder can move over per frame in a group of motion linked with the groups of motion. The amount of movement per frame corresponds to the distance of movement of the position of a fielder acting by a group of motion every time the displayed image of the frame is updated.

Further, the distance of movement is set in units of meters (m) assuming a distance in the case where the baseball field defined in the virtual space is the same size as an actual baseball field. Note that the same applies to the units of distance, amount of movement, and height as well. The values set in the "amount of movement per frame" column are for example positive real numbers.

In the present embodiment, the amount of movement per frame for the groups of motion #11, #12, #13, #14, and #15 is for example set to 0.30 m. The amount of movement per frame for the groups of motion #21, #22, #23, #24, #41, #42, #43, #44, and #M is for example set to 0.20 m. The amount of movement per frame for the groups of motion #31, #32, #33, and #34 is for example set to 0.15 m.

Then "catching range" column is set with the range in which a ball can be caught in a group of motion linked with the groups of motion. The catching range is expressed by the distance of the range of movement where the movement of the field can be expressed realistically and smoothly in a group of motion given with reference to the position of the fielder. In FIG. 5, L1, L2, L3, L4, L5, and L6 show the distances which can be moved over from a reference point given with reference to the position of the fielder. The values set for L1 to L6 are for example all positive real numbers.

In the present embodiment, the catching range for each of the groups of motion #11, #12, #13, and #14 is for example L1 to L2 (range from distance L1 away from position of fielder to less than distance L2). The catching range for the groups of motion #15 is for example less than L1 (range of less than distance L1 from position of fielder).

The catching range for the groups of motion #21, #22, #23, #41, #42, and #43 is for example L3 to L4 (range from distance L3 away from position of fielder to less than distance L4). The catching range for the groups of motion #24, #44, #M is for example less than L3 (range of less than distance L3 from position of fielder).

The catching range for the groups of motion #31, #32, and #33 is for example L5 to L6 (range from distance L5 away from fielder to less than distance L6). The catching range for the groups of motion #34 is for example less than L5 (range of less than distance L5 from fielder).

The "height of glove at catching" column is set with the height of the glove when the fielder catches the ball in each group of motion linked with the groups of motion. The values set here are for example positive real numbers.

In the present embodiment, the height of the glove at the time of catching for the groups of motion #11, #15, #21, #24, #31, #34, #41, and #44 is for example H1. The height of the glove at the time of catching for the groups of motion #12, #22, #32, and #42 is for example H2. The height of the glove at the time of catching for the groups of motion #13, #23, #33, and #43 is for example H3. The height of the glove at the time of catching for the groups of motion #14 and #M is for example H4.

The "range of catchable height" column is set with the range of height where the fielder can catch the ball by each group of motion linked with the groups of motion. The range of catchable height is set to the height of the glove at the time of catching given with reference to the ground surface. The values set here are for example positive real numbers.

In the present embodiment, a group of motion with a height of the glove at the time of catching of "H1" is set with for example a range of a height 0 to less than h1 (0 (m) to h1). A group of motion with a height of the glove at the time of catching of "H2" is set with for example a range of a height h1 to less than h2 (h1 to h2). A group of motion with a height of the glove at the time of catching of "H3" is set with for example a range of a height h2 to less than h3 (h2 to h3). A group of motion with a height of the glove at the time of catching of "H4" is set with for example a range of a height h3 to less than h4 (h3 to h4). Note that the values taken by h1, h2, h3, and h4 are positive real numbers.

In this way, the groups of motion at the directions A, B, C, D, . . . are set for each height of the glove at the time of catching. The "height of the glove" indicates the height from the surface of the baseball field to the glove given with reference to the surface at the catching pose. For example, the values of H1 (0.05 m), H2 (0.58 m), H3 (1.10 m), and H4 (1.98 m) are set. The range of catchable height is determined in accordance with the height of the glove at the time of catching.

For example, the values h1, h2, and h3 showing the two boundary values of the "range of catchable height" are calculated by the following equations 6, 7, and 8:

$$h1 = (H1+H2)/2 \qquad 6$$

$$h2 = (H2+H3)/2 \qquad 7$$

$$h3 = (H3+H4)/2 \qquad 8$$

Further, the maximum value of the "range of catchable height" is for example made "h4". According to this, the "range of catchable height" is set to for example 0 (m) to h1, h1 to h2, or h3 to h4.

Next, as shown in FIG. 6, the "throwing direction" column is set with the throwing direction in each group of motion linked with the groups of motion. In the example of FIG. 6, for example, the throwing direction is determined in advance in 360 degree directions such as for example forward, right, left, and back.

A group of motion with a "forward" throwing direction is for example a group of motion where an infielder throws the ball to the catcher on home plate. A group of motion with a "right" throwing direction is for example a group of motion where the shortstop throws the ball to the third baseman covering third base. A group of motion with a "left" throwing direction is for example a group of motion where the second baseman throws the ball to the first baseman covering first base. A group of motion with a "back" throwing direction is for example a group of motion where the pitcher throws the ball to the second baseman covering second base or the shortstop.

The "throwable distance" column is set with the maximum distance over which the ball flies when thrown by the action of a fielder by each group of motion linked with the groups of motion. In FIG. 6, D1 and D2 indicate the flight distance when the ball is thrown given with reference to the position of the fielder. Here, D2 is set larger in distance than D1. The values taken by D1 and D2 are positive real numbers.

In the example of FIG. 6, the throwable distances for the groups of motion #11, #12, #13, #14, #21, #22, #23, #24, #31, #32, #33, 34, #41, #42, #43, and #44 is for example "D1 to D2" (range D1 away and less than distance D2). The throwable distance for the groups of motion #15 and #M is "0 (m) to D1" (range of less than distance D1).

A group of motion with a throwable distance of "D1 to D2" is for example a group of motion by which a ball is thrown overhand. Further, the group of motion with a catchable distance of "0 (m) to D1" is for example a group of motion by which a ball is thrown underhand.

The baseball game is played out while referring to the data shown in the above FIG. 5 and FIG. 6. That is, when the ball is made to move in the baseball game, the number of frames is obtained from the data for the above groups of motion. The position of the ball at the point of time when the display is changed by exactly the number of frames obtained from the display position of the ball is predicted.

The distance over which a fielder can be made to move by a group of motion is calculated from the number of frames corresponding to the groups of motion and the amount of movement of the fielder per frame. It is sequentially judged if the fielder can reach the position of the ball obtained by the prediction for each group of motion based on the calculated distance.

When using one group of motion, it is judged that the fielder can catch the ball by that group of motion if the fielder can reach the future position of the ball. If it is judged that he can catch the ball, the series of motion expressed by that group of motion is changed on the display screen. Note that to predict the position of the ball at the point of time after displaying exactly that number of frames on the screen, calculation of the direction of movement, speed, etc. of the ball becomes necessary.

Note that in the present embodiment, the groups of motion, that is, the configuration of the motion data, are not particularly limited. That is, it is also possible to set the series of motion from the catching pose to the throwing action as one group of motion or possible to provide the series of motion from the catching pose to the catching action and the series of motion from the catching state to the throwing state as independent groups of motion and configure the data to enable these to be linked and connected at any time. The present invention is not limited to the above configuration.

Further, depending on the memory capacity, it is possible to give groups of motion for all 360 degrees of direction about the fielder, but it is also possible to limit the direction of movement such as to the four directions of forward, back, left, and right. In this case, the desired direction of movement of the fielder will not match the forward direction from the position of the fielder (for example, 0 degree), right direction (for example, 90 degrees clockwise), back direction (for example, 180 degrees clockwise), or left direction (for example 270 degrees clockwise), so the direction of the fielder may be finely adjusted (rotated) to the closest direction. Of course, the directions of movement are not limited to four directions and for example may also be eight directions. The number of directions may be changed in various ways according to the amount of use of the memory, expression of the game, and other conditions.

Figure 7:
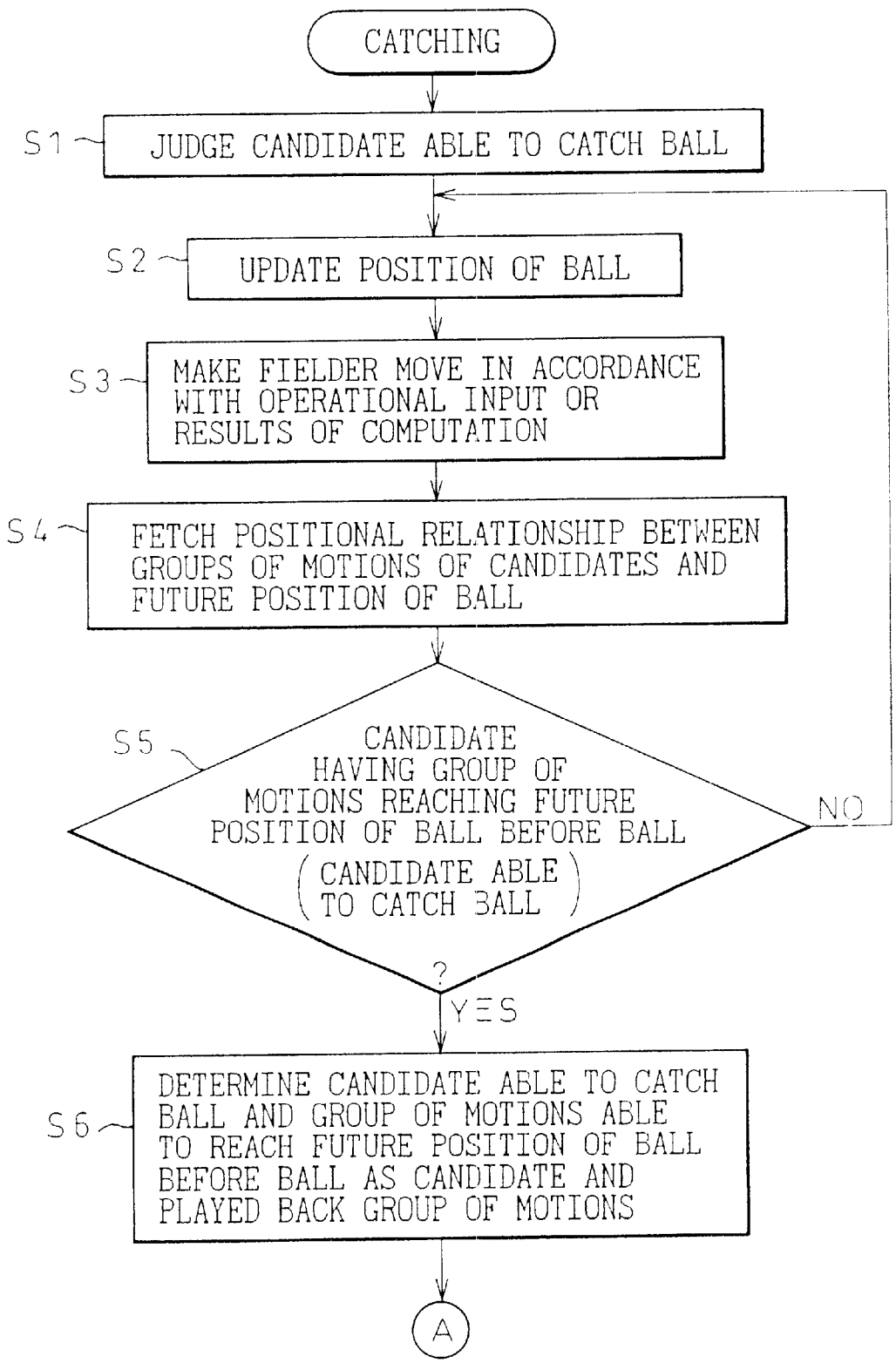
FIG. 7 is a flow chart for explaining an example of operation according to an embodiment of the present invention.

Next, an explanation will be given of the operation according to the embodiment. FIG. 7 and FIG. 8 are flow charts for explaining the operation according to an embodiment of the present invention. The flow chart of FIG. 7 and FIG. 8 explains an example of the action of the catcher when a batter hits back the ball of the pitcher.

First, the fielders able to catch the ball (candidates) are determined in accordance with the direction in which the batter hit the ball (step S1). One or more fielders positioned in a range of for example 20 to 30 degrees with respect to the direction of the hit ball become candidates for the catching.

Next, the trajectory of the ball is calculated based on the direction in which the ball is proceeding and the speed of movement etc. and the current position of the ball on that trajectory is updated (step S2). The position of the ball is updated in this way every frame. Note that in calculating the trajectory of the ball, it is also possible to take into consideration the direction of rotation of the ball, the direction of the wind, etc. in the calculation.

Further, the fielder is made to move in accordance with operational input or the results of processing (step S3). For example, the fielder moving in response to the operational input of the user is the fielder positioned closest to the ball. The other fielders other than the fielder moving in response to the operational input of the user are for example made to move by processing by the computer. In the processing by the computer, for example, the fielders close to the bases are made to move to cover the bases.

Next, the catching ranges of the groups of motion linked with each candidate and the future positions of the ball are obtained (step S4). For example, the number of frames from the start of action to catching in each group of motion linked with each candidate is obtained. Further, the future positions of the ball are obtained for exactly the amount of the obtained frames.

Next, it is judged if there is a candidate having a group of motion enabling it to reach the future position of the ball before the ball actually arrives at the position (candidate able to catch ball) (step S5). This is judged based on the catching range of the groups of motion linked with each candidate and the positional relationship with the future position of the ball. That is, if the catching range given with reference to the current position of each candidate includes a future position of the ball, it is judged that the candidate can catch the ball.

When no candidate able to catch the ball can be found (step S5: NO route), the routine proceeds to step S2 and the processing from step S2 to step S5 is repeated. While the processing from step S2 to step S5 is being repeated, the position of the ball and the position of the field are updated for each frame.

When a candidate able to catch the ball is found (step S5: YES route), the candidate able to catch the ball is determined as the catcher and the group of motion enabling the catcher to move to the future position of the ball is determined as the played back group of motion (step S6).

Proceeding to FIG. 8, the catching position is determined based on the number of frames until catching of the played back group of motion (step S7). For example, if there are 20 frames until catching in the played back group of motion, the arrival position of the ball after 20 frames becomes the catching position. Further, the height of the glove at the time of catching in the played back group of motion is obtained (step S8).

The pose of the catcher is obtained based on the played back group of motion (step S9). The played back group of motion has defined in it the relative angles of the connection parts in the skeleton for each frame. By applying the angles to the skeleton of the fielder, the pose of the fielder can be obtained.

The amount of correction of the height of the glove of the fielder is calculated in accordance with the difference between the height of the catching position of the ball from the ground and the height of the glove at the time of catching in the played back group of motion (step S10). The amount of correction can be calculated by for example the above equation 1. The pose of the fielder is corrected based on the amount of correction of the height of the glove of the fielder and displayed on the screen (step S11). The pose of the fielder may be corrected by correcting the angles of the arm holding the glove with the shoulder and elbow.

After display on the screen, it is judged if the playback of motion by the played back group of motion has ended (step S12). Whether the playback of motion has ended or not is judged by whether the display of the final frame of the played back group of motion has ended or not. If the playback of the motion has not ended (step S12: NO route), the processing proceeds to step S8, where the pose of the fielder in the next frame is displayed on the screen. Further, if the playback of the motion has ended (step S12: YES route), the processing ends.

As explained above, according to the above embodiment, it is possible to prepare a series of motion including the catching action in advance and display the movement of the fielder using the motion of his sticking out his glove accurately to the arrival position of the ball (catching position). Due to this, even if realistically expressing the movement of the fielder, it is possible to realistically and smoothly express the successive actions of the fielder 1n without causing positional deviation between the ball and the glove of the fielder.

Note that in the above embodiment, all of the poses of the group of motion linked with the fielder (player) in advance from the start of motion to the catching were corrected, but it is not necessarily required to correct all poses. For example, it is also possible to correct the pose of the player from a frame counted back by a predetermined number of frames from the frame giving the catching pose. Further, it is also possible to determine the number of frames for correcting the pose of the player in accordance with the amount of deviation between the arrival position of the ball and the glove (catching part) of the catching pose due to the group of motion.

Further, in the above embodiment, the explanation was made of the correction of motion up to catching, but it is also possible to similarly correct the motion after catching. For example, by correcting the position of the glove at motion shifting from catching to throwing or the position of the arm holding the ball, it is possible to make the glove position move smoothly from the corrected catching pose to the throwing action.

Further, in the above embodiment, the height of the glove from the ground surface was corrected, but it is also possible to correct not only the height, but also the position of the glove back, forth, right, and left.

Further, in the above embodiment, the amount of correction of the catching part (position of glove) was sequentially found for every frame of motion at the time of catching, but it is also possible to find the amount of correction of the catching part at each frame in advance at the time of start of motion. That is, at the time of start of motion, the catching position is determined by the trajectory of the ball and the catching motion. Therefore, it becomes possible to find in advance the amount of correction at each frame for making the catching part move smoothly to the catching position. Even if finding the amount of correction of each frame in advance, it is possible to reproduce catching motion similar to that of the above embodiment.

In the above embodiment, the example was given of a baseball game as a ball-playing type game, but the present invention is not limited to this. It may be applied to any ball-playing game where a player catches a ball such as soccer, basketball, American football, tennis, and ice hockey.

Further, the present invention can be applied to any of a specialized game machine, arcade machine, personal computer, portable information terminal, mobile phone, etc. In the above embodiment, the program for realizing the embodiment of the present invention was stored in a CD-ROM or hard disk, but the present invention is not limited to this. It is also possible to store it on a Magneto-optical disk (MO), DVD, or other computer readable program product. Further, when downloading the above program on to a hard disk, it is possible to use a commercial network, the Internet, Intranet, Extranet, etc. for the network 111.

Summarizing the effects of the invention, according to the present invention, it is possible to obtain a computer readable program product storing a program of a ball-playing game which, when making a player catch a ball in the ball-playing game, enables the ball to be caught smoothly by a continuous action by correcting the pose of the player until the player catches the ball in accordance with a future position of the ball, such a program, and a ball-playing type game processor and method thereof.

While the invention has been described by reference to specific embodiments chosen for purposes of illustration, it should be apparent that numerous modifications could be made thereto by those skilled in the art without departing from the basic concept and scope of the invention.

What is claimed is:

1. A computer readable program product storing a program of a ball-playing type game for realizing a ball-playing type game controlling action of a player catching a moving ball, said program product storing a program for making a computer:

calculate a trajectory of a ball, predict a point of time on a time axis when a player catches said ball from a group of motion linked with said player in advance and said calculated trajectory, calculate a deviation in positional relationship between a catching pose of said player and the ball on the calculated trajectory either at the predicted point of time or before and after the predicted point of time, calculate a correction amount for the catching pose of said player based on the calculated deviation in the positional relationship, and correct said group of motion prepared in advance based on said calculated correction amount in at least part of the time when displaying said player based on said group of motion prepared in advance.

2. The program product as set forth in claim 1, wherein in said correction of said group of motion, all of the group of motion prepared in advance are corrected.

3. The program product as set forth in claim 1, wherein said amount of correction of the catching pose of said player is found from the deviation in positional relationship between a catching part of said player and the ball on the calculated trajectory.

4. The program product as set forth in claim 3, wherein said player exhibits actions by movement of his joints and, in correction of the group of motion, the movement of the joints of the player is corrected.

5. A ball-playing type game processor comprising:

a computer readable program product storing a program of a ball-playing type game for realizing a ball-playing type game controlling action of a player catching a moving ball, a computer for reading and executing at least part of the program from said program product, and a display for displaying the ball-playing type game realized by said program, said computer reading at least part of the program from said program product and thereby calculating a trajectory of a ball, predicting a point of time on a time axis when a player catches said ball from a group of motion linked with said player in advance and said calculated trajectory, calculating a deviation in positional relationship between a catching pose of said player and the ball on the calculated trajectory either at the predicted point of time or before and after the predicted point of time, calculating a correction amount for the catching pose of said player based on the calculated deviation in the positional relationship, and correcting said group of motion prepared in advance based on said calculated correction amount in at least part of the time when displaying said player based on said group of motion prepared in advance.

6. The ball-playing type game processor as set forth in claim 5, wherein in said correction of said group of motion, all of the group of motion prepared in advance are corrected.

7. The ball-playing type game processor as set forth in claim 5, wherein said amount of correction of the catching pose of said player is found from the deviation in positional relationship between a catching part of said player and the ball on the calculated trajectory.

8. The ball-playing type game processor as set forth in claim 7, wherein said player exhibits actions by movement of his joints and, in correction of the group of motion, the movement of the joints of the player is corrected.

9. A ball-playing type game processing method for realizing a ball-playing type game controlling action of a player catching a moving ball, comprising calculating a trajectory of a ball, predicting a point of time on a time axis when a player catches said ball from a group of motion linked with said player in advance and said calculated trajectory, calculating a deviation in positional relationship between a catching pose of said player and the ball on the calculated trajectory either at the predicted point of time or before and after the predicted point of time, calculating a correction amount for the catching pose of said player based on the calculated deviation in the positional relationship, and correcting said group of motion prepared in advance based on said calculated correction amount in at least part of the time when displaying said player based on said group of motion prepared in advance.

10. The ball-playing type game processing method as set forth in claim 9, wherein in said correction of said group of motion, all of the group of motion prepared in advance are corrected.

11. The ball-playing type game processing method as set forth in claim 9, wherein said amount of correction of the catching pose of said player is found from the deviation in positional relationship between a catching part of said player and the ball on the calculated trajectory.

12. The ball-playing type game processing method as set forth in claim 11, wherein said player exhibits actions by movement of his joints and, in correction of the group of motion, the movement of the joints of the player is corrected.

* * * * *